(12) United States Patent
de Lind van Wijngaarden et al.

(10) Patent No.: US 8,405,701 B2
(45) Date of Patent: Mar. 26, 2013

(54) SYSTEM TO FREELY CONFIGURE VIDEO CONFERENCING CAMERA PLACEMENT

(75) Inventors: Adriaan J. de Lind van Wijngaarden, New Providence, NJ (US); Bilgehan Erman, Marlboro, NJ (US); Vanita K. Katkar, White House Station, NJ (US); Elissa P. Matthews, Watchung, NJ (US)

(73) Assignee: Alcatel Lucent, Paris (FR)

( * ) Notice: Subject to any disclaimer, the term of this patent is extended or adjusted under 35 U.S.C. 154(b) by 959 days.

(21) Appl. No.: 12/457,415

(22) Filed: Jun. 10, 2009

(65) Prior Publication Data

US 2010/0315479 A1 Dec. 16, 2010

(51) Int. Cl.
*H04N 7/15* (2006.01)

(52) U.S. Cl. .................................. 348/14.02; 348/14.08

(58) Field of Classification Search ............... 348/14.02, 348/14.01, 14.08, 14.09, 207.1
See application file for complete search history.

(56) References Cited

U.S. PATENT DOCUMENTS

| 5,856,819 | A | 1/1999 | Vossler |
| 5,921,780 | A | 7/1999 | Myers |
| 6,209,266 | B1 | 4/2001 | Branc et al. |
| 7,215,313 | B2 | 5/2007 | Giraldo et al. |
| 2002/0109770 | A1* | 8/2002 | Terada ........................ 348/14.08 |
| 2004/0041902 | A1* | 3/2004 | Washington ............... 348/14.01 |
| 2005/0073575 | A1* | 4/2005 | Thacher et al. ............ 348/14.13 |
| 2005/0162508 | A1* | 7/2005 | Basmadjian et al. ...... 348/14.01 |
| 2005/0185614 | A1 | 8/2005 | Ikeda |
| 2006/0001737 | A1 | 1/2006 | Dawson et al. |
| 2008/0291260 | A1* | 11/2008 | Dignan et al. ............. 348/14.02 |
| 2010/0245534 | A1 | 9/2010 | De Lind Van Wijngaarden et al. |

FOREIGN PATENT DOCUMENTS

| EP | 1 224 805 | 4/2004 |
| WO | WO 03/077231 | 9/2003 |
| WO | WO 2007/092884 | 8/2007 |

OTHER PUBLICATIONS

"Wireless PTZ Internet Camera with Audio Flexible Remote Controlled Wireless Video Solution for Your Small Business," Linksys, www.linksys.com, retrieved Dec. 16, 2008, 1992-2008.

* cited by examiner

*Primary Examiner* — Stella Woo
(74) *Attorney, Agent, or Firm* — Harness, Dickey & Pierce

(57) ABSTRACT

Embodiments of the present invention are directed to cordless video conferencing camera adaptors and video conferencing systems including the camera adaptors. Embodiments of the present invention overcome some of the inherent problems of known video conferencing products by being a part of a portable and configurable video conferencing system, which can be used in various meeting rooms, laboratories, training rooms, and conference halls. For example, embodiments of the invention allow use of low cost (e.g., under $100) cameras to provide any angle of video coverage in any conference room setting.

20 Claims, 8 Drawing Sheets

Coverage of any meeting room layout

Team Meeting　　　Dept Meeting　　　Demonstration

SYSTEM TO FREELY CONFIGURE VIDEO CONFERENCING CAMERA PLACEMENT

BACKGROUND OF THE INVENTION

This section introduces aspects that may be helpful in facilitating a better understanding of the invention. Accordingly, the statements of this section are to be read in this light and are not to be understood as admissions about what is in the prior art or what is not in the prior art.

Many technical and psychological obstacles prohibit wide acceptance of video conferencing. For example, providing sufficient video and audio coverage of conference participants in a meeting room can be difficult and expensive. Typically, commercial video conferencing systems are designed to be placed at the edge of a meeting room, close to a TV unit with a dedicated special camera on top of the TV unit. However, this configuration provides inadequate video coverage of meeting participants and other possible points of interest in the room, e.g., a whiteboard, demonstration setups, etc. Audio coverage may also be a problem, as remote meeting participants may frequently experience less than ideal audio coverage at a remote meeting site.

In addition, for a camera to function, transmission of video signals using high bandwidth is needed, therefore, video cameras are placed close to a video conferencing Multipoint Control Unit (MCU), which controls a video conferencing system, so the video cameras can be connected via industry-standard, high speed interfaces such as IEEE 1394 (FireWire) or Universal Serial Bus (USB). Also the MCU may be connected to a monitor.

SUMMARY OF THE INVENTION

Embodiments of the present invention are directed to cordless video conferencing camera adaptors and video conferencing systems including the camera adaptors. Embodiments of the present invention overcome some of the inherent problems of known video conferencing products by being a part of a portable and configurable video conferencing system, which can be used in various meeting rooms, laboratories, training rooms, and conference halls. For example, embodiments of the invention allow use of low cost (e.g., under $100) cameras (e.g., wired, wireless, corded, etc.) to provide any angle of video coverage in any conference room setting.

An embodiment of the present invention includes a cordless video conferencing camera adaptor. The adaptor includes an industry-standard connector such as Universal Serial Bus (USB) configured to connect to a camera with industry-standard connector (e.g. USB), a battery unit configured to supply power to the camera, and a transceiver configured to communicate wirelessly with a central controller. There may be more than one transceiver and the transceiver may also be configured to send at least one video/audio data stream to the central controller. The connector, battery unit and transceiver are housed by a portable housing.

The battery unit may include rechargeable batteries and the adaptor may further include a DC power jack. The battery unit may also be configured to recharge when attached to a base unit. The adaptor may also include a mounting adaptor configured to connect the camera adaptor to a stabilizing unit.

The industry-standard connector (e.g. USB) can connect to various types of cameras, including High Definition (HD), Pan-Tilt-Zoom, remote control, wide-angle, 180 degree view, 360 degree view, manually adjustable, fixed position, video recorders, camcorders, and combinations thereof. The housing is also configured to keep the camera with industry-standard connector stable and can also be mounted to a tripod through the mounting adaptor.

At least one of the transceivers can communicate over a high bandwidth wireless connection, e.g., Wireless Local Area Network (WLAN) 802.11 or Personal Area Network (PAN) 802.15. The camera adaptor may be any shape determined e.g., by manufacturing needs, connection needs, etc.

Another embodiment provides a system including at least two of the cordless camera adaptors discussed above. The system also includes a power recharging base unit and a central controller. The central controller may be an MCU including a wireless transceiver and a media processor. The system may also include a remote node communicatively coupled to the MCU and also configured to receive and reproduce processed audio and video streams.

Another embodiment may provide a system including an administration client unit that can be used to configure and operate the MCU.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

In the following description, illustrative embodiments will be described with reference to hardware and acts and symbolic representations of operations (e.g., in the form of flowcharts) that may be implemented as program modules or functional processes including routines, programs, objects, components, data structures, etc., that perform particular tasks or implement particular abstract data types and may be implemented using one or more digital signal processors (DSPs), application-specific-integrated-circuits, field programmable gate arrays (FPGAs), computers, etc.

Embodiments of the present invention are directed to cordless video conferencing camera adaptors and video conferencing systems including the camera adaptors. Embodiments of the present invention overcome some of the inherent problems of known video conferencing products by being a part of a portable and configurable video conferencing system, which can be used in various meeting rooms, laboratories, training rooms, and conference halls. The cordless camera adaptor provides an industry-standard interface (e.g., USB, FireWire, etc.) that can plug into off-the-shelf cameras.

Figure 1A:
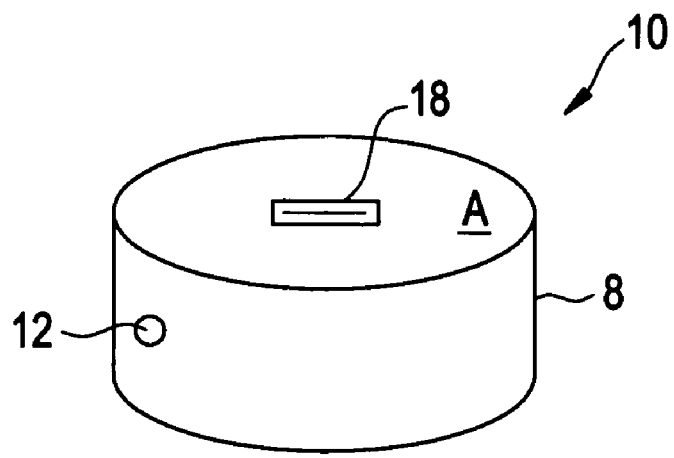
FIG. 1A shows an embodiment of the cordless video conferencing camera adaptor, according to the present invention.

FIG. 1A shows an embodiment of the cordless video conferencing camera adaptor 10. Adaptor 10 connects to known off-the-shelf cameras through connector 18 on side A of housing 8. As shown, side A is substantially flat. Connector 18 may be any type of universal, industry-standard connector, e.g., USB, FireWire, etc. Adaptor 10 works with both DC power through connector/jack 12 and/or batteries (17 shown in FIG. 1B). The batteries may be rechargeable. The adaptor 10 includes at least one transceiver 16 (shown in FIG. 1B) that communicates with a multipoint control unit (MCU) 200 (shown in FIG. 2). Finally, housing 8 is shown as approximately having the size and shape of a hockey puck, but may have any shape, for example, circular, square, rectangular, oval, or multi-sided, and vary in size as required by the engineering design. Housing 8 may be made of polymer, plastic, etc.

Figure 1B:
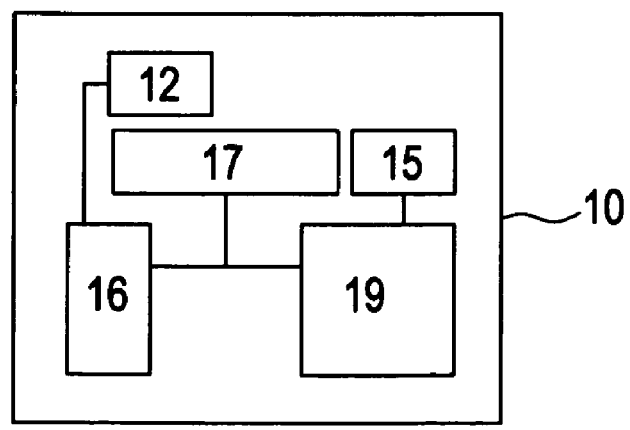
FIG. 1B is a block diagram of parts of an embodiment of the cordless video conferencing camera adaptor, according to the present invention.

FIG. 1B illustrates the internal components of an embodiment of the cordless camera adaptor 10. For example, as shown in FIG. 1B, adaptor 10 includes at least one processor 19, at least one memory 15, at least one transceiver 16, a DC voltage connector 12, and batteries 17 housed by housing 8. As will be discussed below, processor 19 includes sufficient processing power for the adaptor 10 to be able to send and receive data, manage the power requirements of the various components, etc. Transceiver 16 may communicate wirelessly with the MCU 200. The memory 15 may be a non-volatile memory (e.g., flash memory, etc.) storing program and/or data for and/or by the processor 19.

Figure 1C:
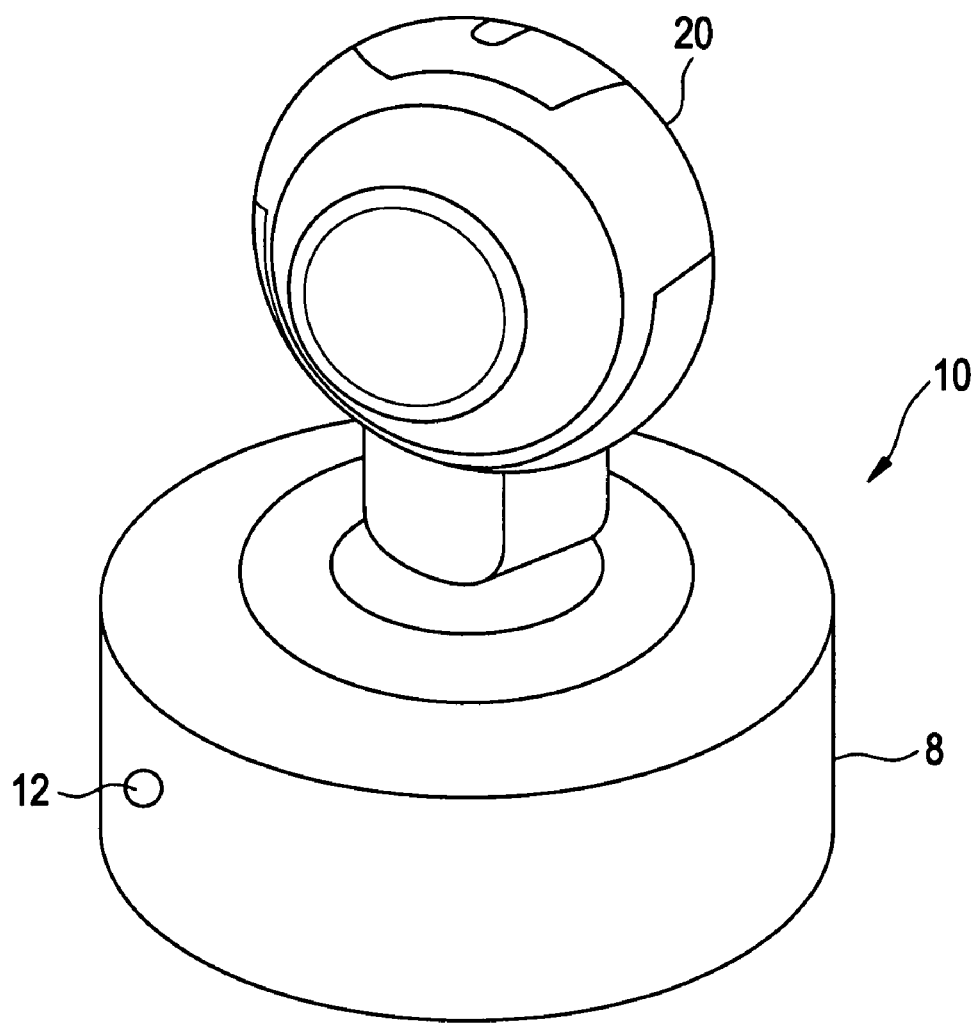
FIG. 1C shows an embodiment of the cordless video conferencing camera adaptor with a camera attached thereto, according to the present invention.

FIG. 1C shows an embodiment of the cordless camera adaptor 10 with a camera 20 connected thereto through connector 18 (not shown). As discussed above, adaptor 10 may include various types of connectors, including, e.g., USB, FireWire, etc., by which camera 20 is connected. Various types of cameras may be used with camera adaptor 10 including, e.g., High Definition (HD), Pan-Tilt-Zoom, remote control, wide-angle, 180 degree view, 360 degree view, manually adjustable, fixed position, video recorders, camcorders, and combinations thereof. As will be appreciated, some cameras such as pan-tilt cameras permit adjusting the camera along a vertical axis and a rotational axis pursuant to instructions received from the MCU 200. Many of these types of cameras may currently be bought off-the-shelf at electronic stores.

Figure 1D:
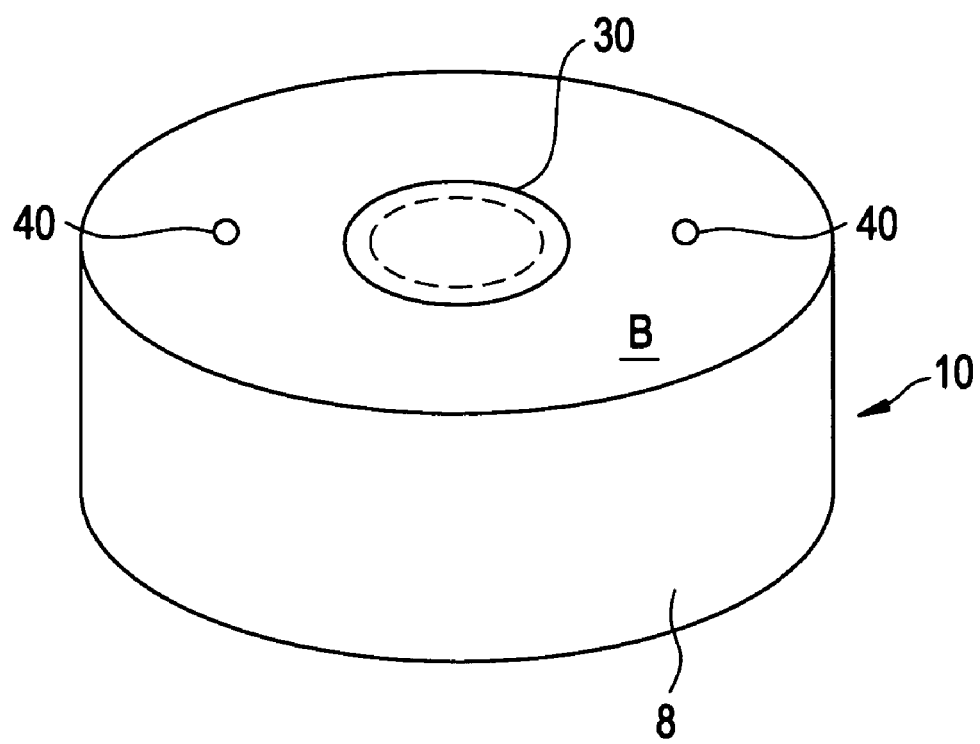
FIG. 1D shows the bottom side of an embodiment of the cordless video conferencing camera adaptor, according to the present invention.

While FIG. 1A illustrates a top side A of the adaptor 10, FIG. 1D illustrates the opposite or under side B of the adaptor 10. As shown in FIG. 1D, side B is substantially flat and includes a mount 30 and power contacts 40. The mount 30 is shown as a female end of a tripod connector (e.g., a hole with threads). For purposes of the invention, various other connectors are usable as well. Also shown are power contacts 40, which allow adaptors 10 to recharge when placed in the MCU 200 (shown in FIG. 2). The surface of side B may also be rubber, synthetic rubber, or other high-friction material to promote stability of the adaptor 10 such as when placed on various surfaces (e.g., non-flat or inclined surfaces).

It will also be appreciated that the adaptor 10 may be varied in many ways. For example, instead of or in addition to connecting to the camera 20, the adaptor 10 may include a camera. As another example, a cable may be used to connect the connector 18 and the camera 20. As a still further example, the camera 20 and the adaptor 10 may communicate wirelessly. As yet another example, a microphone may be incorporated with the camera 20 such that audio and video data from the camera 20 are supplied by the adaptor to the MCU 200. However, instead of or in addition to the camera 20 including a microphone, a microphone may be incorporated into the adaptor 10 or be a stand alone device connected by wire or wirelessly to the adaptor 10. As a still further example, charging may be achieved by induction instead of a direct connection.

It will also be appreciated that the adaptor 10 and/or the camera 20 may include a mute and/or volume control. In addition, on/off switches may be provided on the adaptor 10 and/or camera 20.

If the adaptor 10 sends multiple streams (e.g., video and audio, multiple video, etc.) to the MCU 200, the streams may be multiplexed in any well-known manner.

Figure 2:
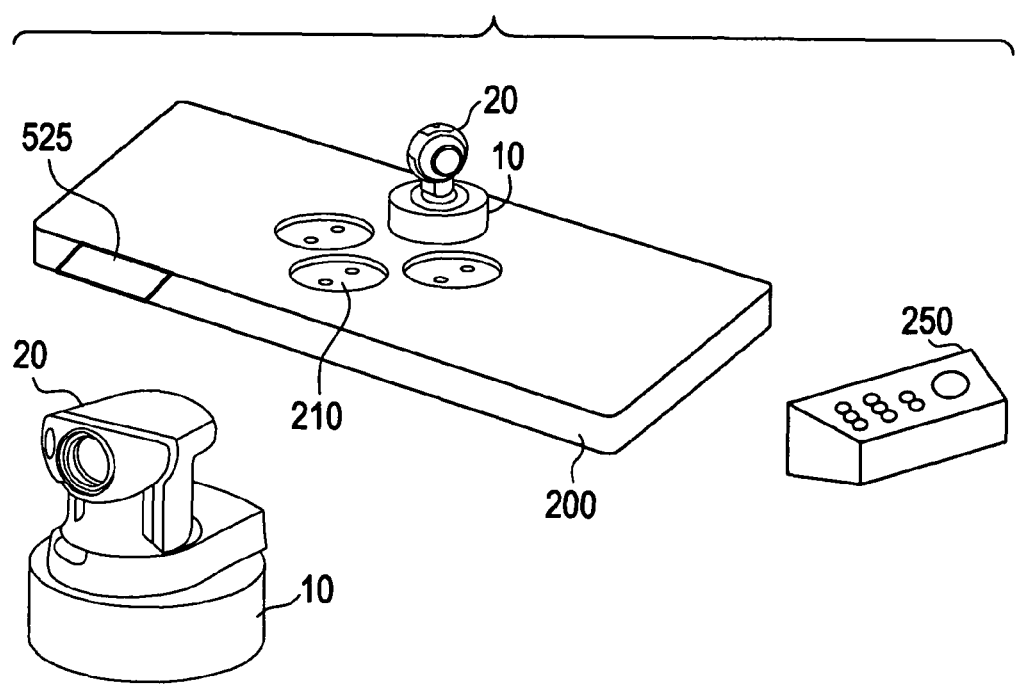
FIG. 2 shows an embodiment of a video conferencing system, according to the present invention.

FIG. 2 shows an embodiment of a video conferencing system according to the present invention. As illustrated, this system includes at least two camera adaptors 10, a base unit 200 that acts as a MCU, power source and recharger for camera adaptors 10 when power contacts 40 sit in power connections 210, and an administration client (AC) 250. Accordingly, for the purposes of discussion, the base unit 200 will be referred to as the MCU 200. However, it will be understood that the MCU functionality may be provided in a unit separate from and connected to the base unit 200.

As shown, cameras 20 are connected to adaptors 10 as previously described with reference to FIGS. 1A and 1C. One set (a camera adaptor 10 and a camera 20) is shown charging on base unit 200 and another set is shown ready for use in a video conference. The MCU 200 controls the adaptors 10 and therefore, the cameras 20 as well. For example, MCU may include transceiver 525 to communicate with adaptor 10 through transceiver 16. Processor 19 may locally control transceiver 16 and send instructions to camera 20 through the connector 18, to, for example, tilt, zoom, pan, etc. Camera adaptors 10 are wirelessly connected to MCU 200 through, e.g., transceiver 16, and the MCU 200 is shown in the same room as the adaptors 10. Battery-operation of the adaptors 10 allows placement of the adaptors 10 anywhere in a room during a meeting. At the end of the meeting, the adaptors 10 may be placed on MCU 200 for recharging through power connection 210. The MCU 200 may include a standard AC connector (not shown), and convert AC power to DC power, and charge the adaptors 10 using the DC power. The MCU 200 may include various visual and/or audible indicators (not shown) to show charging, status of the adaptors 10, etc.

The wireless transport protocol that is used between the cordless adaptors 10 and the MCU 200 should be able to support broadband communication. The video/audio signal from cameras 20 can be sent to the MCU 200 via standard wireless local area network such as 802.1 in, Wireless Personal Area Network (WPAN) such 802.15, or Ultra Wideband (UWB). Adaptor 10 should incorporate enough computing capability (e.g., implemented in on-board firmware, processor 19, etc.) to identify itself to the MCU 200, to maintain connection lifecycle with the MCU 200, and to conduct basic maintenance and diagnostic operations, for example, battery level, port states, etc. Security and privacy of a video conference session is achieved by standard security features of the Wireless LAN connections, limiting use of the various components to a single session at a time, and indicating an active session via, e.g., an LED light, etc. Cordless de-coupling of the adaptors 10 also allows placement of the video conferencing MCU 200 anywhere in the room.

The MCU 200 and the AC 250 will be described in greater detail below with respect to FIG. 5.

Figure 3:
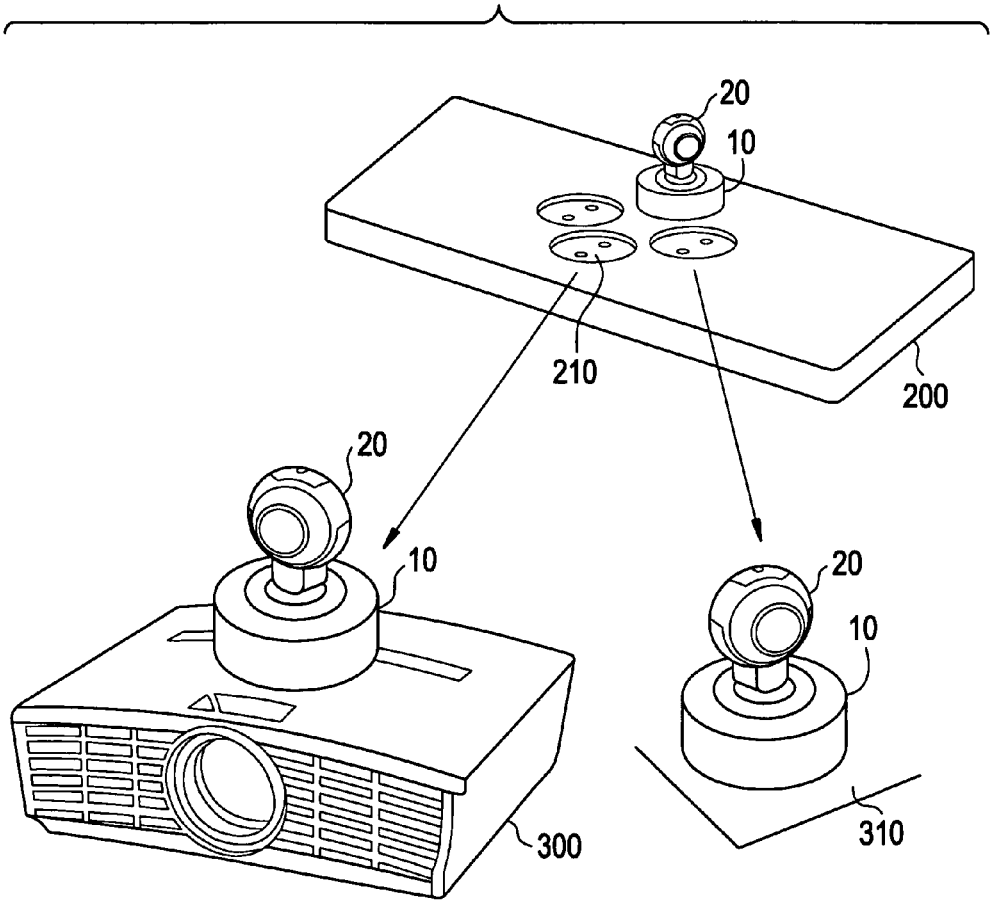
FIG. 3 shows embodiments of the camera adaptor being placed for use during a video conference, according to the present invention.
Figure 4:
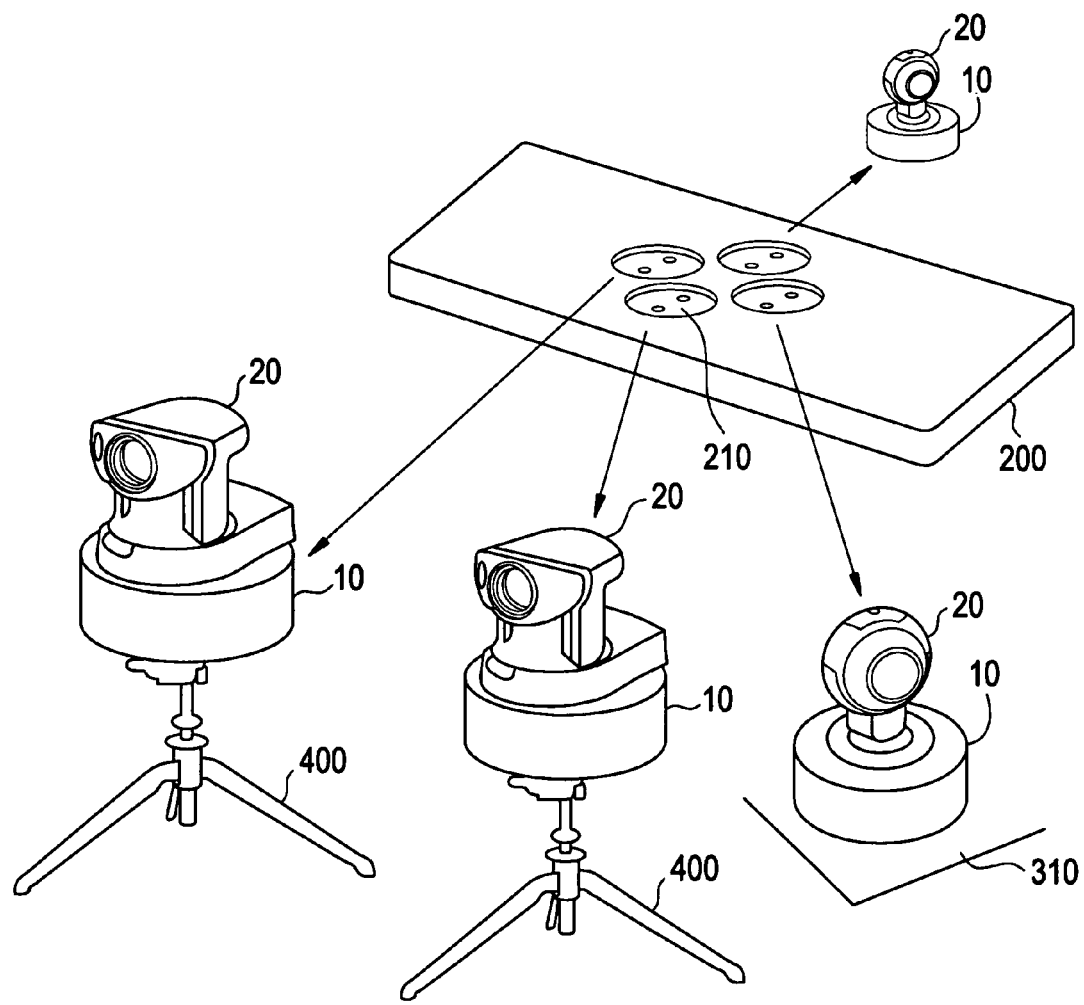
FIG. 4 shows embodiments of the camera adaptor being placed for use during a video conference using tripods, according to the present invention.

FIGS. 3 and 4 are further embodiments of adaptors 10 shown with wireless cameras 20 and MCU 200. In FIGS. 3 and 4, adaptors 10 are shown being charged by MCU 200 through power connection 210, sitting on a flat surface 310, mounted on a projector 300 (e.g., mount 30), and mounted on a tripod 400 (using mount 30). To ensure the cameras 20 are stable, adaptors 10 may include mounts 30 on the opposite side B from the camera connector 18, which allow the adaptors 10 to sit on a stabilization device, e.g., a tripod 400. Alternatively, the adaptors 10 have a reasonably flat bottom surface B so that they are able to keep the cameras 20 stable when placed around a room. Also shown in FIG. 3 is an adaptor 10 with a camera 20 mounted atop a projector 300, the camera being used, for example, to track a speaker during a presentation. As will be obvious to one of ordinary skill in the art, various configurations of the system components are contemplated even if not specifically shown.

Figure 5:
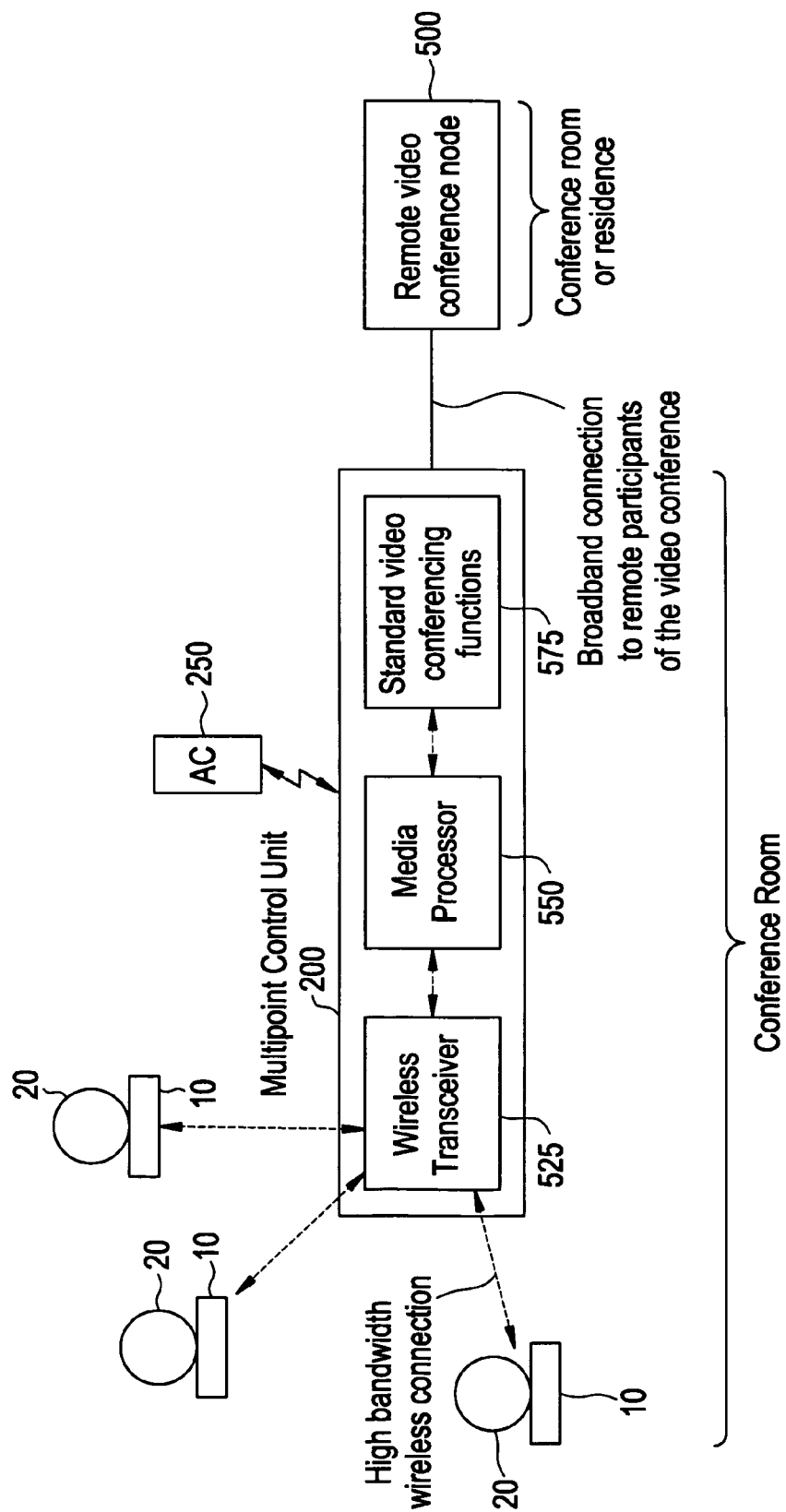
FIG. 5 illustrates an embodiment of a video conferencing system, according to the present invention.

FIG. 5 shows another embodiment of the video conferencing system, which further includes a remote node 500. As shown in FIG. 5, there are three adaptors 10 and three corresponding cameras 20, all wirelessly communicating with MCU 200. Within MCU 200 there are also sub-components that support the operation of cameras 20 through adaptors 10. These sub-components include a wireless transceiver 525 and a media processor 550. Also included in MCU 200 are standard electronic components that control video conferencing functions 575 thereof, which are well known and therefore will not be further discussed. The wireless transceiver 525 is the peer-end of the cordless camera adaptors 10. The wireless transceiver 525 receives and transmits wireless signals to the cordless camera adaptors 10 by standard wireless transmission functionality, e.g., through transceiver 16. Wireless transceiver 525 is capable of identifying each cordless camera adaptor 10 and their corresponding media streams (e.g., audio and video data). The wireless transceiver 525 extracts the media streams received from each cordless camera adaptor 10 and sends the media streams as a single bundle to the media processor 550. As will be appreciated, instead of a wireless connection, the adaptors 10 may be connected by wire to the MCU 200 (e.g., directly or indirectly via a network).

The MCU 200 may be controlled by a user through the AC 250. For example, as is well-known, the AC 250 may be a remote control (as shown in FIG. 2) that permits control of the MCU 200 via menus displayed on a display to which the MCU 200 is connected. Alternatively, the AC 250 may be a computer (e.g., laptop), PDA, etc., and may incorporate a display. The AC 250 may communicate with the MCU 200 via wireless transceiver 525 or any other well-known wired or wireless means.

The media processor 550 then extracts distinct audio and video data streams from the media stream bundle sent from the wireless transceiver 525 and sends the extracted data streams to other components of the MCU (e.g., 575) that conduct standard video conferencing functions (e.g., audio bridging, video switching, etc). It will be appreciated that the media processor 550 may use any well-known techniques for parsing streams and presenting such streams (e.g., audio and video) in a synchronized manner. For example, it is well-known for individual streams to be divided into packets, for the packets to be time stamped, and for the media processor 550 to buffer and output the streams according to the time stamps. Also, as a further option, the MCU 200 may perform echo cancellation.

As indicated above, remote node 500 is also shown in FIG. 5. Remote node 500 is communicatively coupled to MCU 200 and is configured to participate in a video conference controlled by MCU 200. The remote node 500 may be, for example, another video conferencing system, a computer, a display, etc., however, regardless of the specific apparatus, remote node 500 is configured to receive and reproduce the processed video and audio data received from the MCU 200. In other words, remote node 500 is able to view and listen to the various data streams sent from camera adaptors 10.

Figure 6:
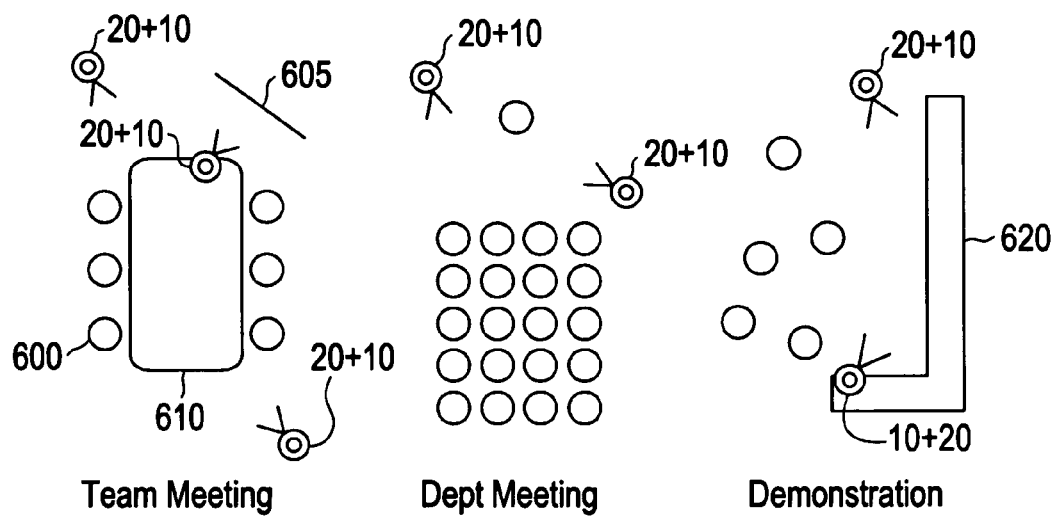
FIG. 6 shows various video conferencing room setups using the camera adaptors of the present invention.

FIG. 6 shows three example embodiments of conference/meeting room setups using the video conferencing systems described above. For example, in the team meeting environment, the combination of camera 20 and adaptor 10 are placed at two opposite corners of the room and one combination is located on a meeting table 610. This configuration allows views of the people 600 participating in the meeting and of a screen or presentation 605. The second configuration is an example of a department meeting. In this configuration there are two combinations of camera 20 and adaptor 10, one facing the audience and one facing the speaker. Finally, the third configuration is an example of a demonstration. The demonstration occurs at "booth" 620 where two camera 20/adaptor 10 combinations are placed so as to capture the demonstration from two directions. It is noted that there are many other obvious variations and setups possible and while not specifically described, they are intended to be covered.

Embodiments of the present invention provide freedom in placement of off-the-shelf wireless cameras across a meeting room for video conferencing. Using multiple camera adaptors as described allows coverage of any video angle within a conference room. The present invention provides flexibility and allows a portable and configurable video conferencing system to cover not only meetings around a single table, but meetings having any configuration. Therefore, embodiments of the invention provide the capability to make commercial, wired/corded cameras operate wirelessly with standard video conferencing system components. As the camera adaptor may be placed anywhere within a room, low cost, $100 cameras can provide close-up video frames without the need for expensive zoom cameras. These frames can cover a whiteboard, part of the meeting room, and/or demo setups in the room.

The invention being thus described, it will be obvious that the same may be varied in many ways. Such variations are not to be regarded as a departure from the invention, and all such modifications are intended to be included within the scope of the invention. The present invention may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

As used herein, the term "and/or" includes any and all combinations of one or more of the associated listed items. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

We claim:

1. A cordless video conferencing camera adaptor, comprising:
    a connector configured to connect to a camera;
    at least one transceiver configured to communicate wirelessly with a central controller and to send at least a video data stream from the camera to the central controller; and
    a portable housing including the connector, the transceiver, and a battery unit, the battery unit configured to supply power to the camera and configured to supply operability information of the adaptor to a base unit.

2. The adaptor of claim 1, wherein the battery unit includes rechargeable batteries.

3. The adaptor of claim 1, wherein the housing includes recharge connectors configured to receive power for recharging the rechargeable batteries if the adaptor is attached to the base unit.

4. The adaptor of claim 1, further including:
    a DC power jack configured to supply power to the camera; and wherein the housing includes the DC power jack.

5. The adaptor of claim 1, wherein the connector is configured to connect at least one of a High Definition (HD) camera, a Pan Tilt Zoom (PGT) camera, a remote control camera, a wide-angle camera, a 180 degree view camera, a 360 degree view camera, a manual adjustable camera, a fixed position camera, a camcorder, and combinations thereof.

6. The adaptor of claim 1, wherein at least a portion of the housing is configured to keep the camera stable when used for a video conference.

7. The adaptor of claim 1, wherein the at least one transceiver communicates over a high bandwidth wireless connection.

8. The adaptor of claim 7, wherein the at least one transceiver communicates using a high bandwidth local area network.

9. The adaptor of claim 1, wherein the housing has at least one of the following shapes: circular, square, rectangular, oval, and multi-sided.

10. The adaptor of claim 1, further including:
    a mounting adaptor configured to connect the adaptor to a stabilizing unit; and wherein
    the housing includes the mounting adaptor.

11. The adaptor of claim 10, wherein the stabilizing unit is a tripod.

12. A video conferencing system, comprising:
    at least one cordless camera adaptor, each adaptor including,
        a connector configured to connect to a camera,
        at least one transceiver configured to communicate wirelessly with a central controller and to send at least a video data stream from the camera to the central controller,
        a battery unit configured to supply power to the camera, and
        a portable housing including the connector, the battery unit, and the transceiver;
    a power recharging base unit configured to recharge each battery unit of the adaptor, the power recharging base unit configured to supply power to the camera and configured to monitor the operability of the adaptor; and
    the central controller configured to process the video data stream received from the adaptor.

13. The system of claim 12, wherein the power recharging base unit includes at least one of visual indicators and audio indicators.

14. The system of claim 12, wherein the power recharging base unit includes the central controller.

15. The system of claim 12, wherein the central controller comprises:
    a wireless transceiver configured to receive an audio and video data stream from the adaptor; and
    a media processor configured to process an audio and video data stream received by the wireless transceiver.

16. The system of claim 15, further including:
    at least one remote node communicatively coupled to the central controller and configured to participate in a video conference controlled by the central controller.

17. The system of claim 16, wherein the remote node is further configured to receive and reproduce processed video data streams.

18. The system of claim 12, further comprising:
    a plurality of adaptors; and wherein
    the power recharging base unit is configured to recharge the battery units of more than one of the adaptors; and
    the central controller is configured to process the video data streams received from more than one of the adaptors.

19. A video conferencing system, comprising:
    a plurality of cordless camera adaptors, each adaptor including,
        a connector configured to connect to a camera,
        at least one transceiver configured to communicate wirelessly with a central controller and to send at least a video data stream from the camera to the central controller,
        a portable housing including the connector and the transceiver; and
    the central controller configured to process the video data streams received from the adaptors and configured to monitor the operability of each adaptor.

20. The system of claim 19, wherein
    the transceiver of at least one adaptor is configured to send an audio data stream and the video data stream to the central controller; and
    the central controller is configured to process the video data streams and the audio data streams received from the adaptors.

* * * * *